No. 637,691. Patented Nov. 21, 1899.
J. C. ANDERSON.
WHEEL FOR AUTOMOBILES OR OTHER VEHICLES.
(Application filed June 14, 1899.)
(No Model.)
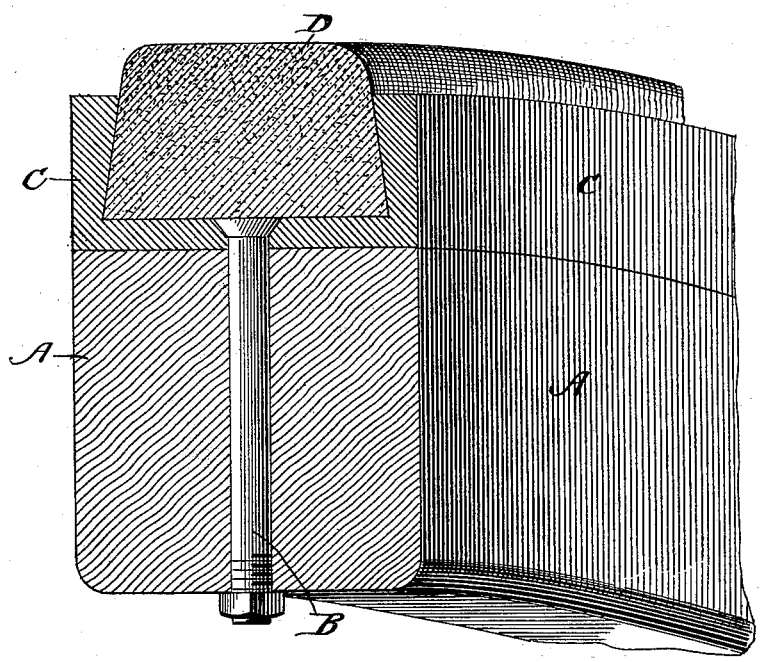
WITNESSES:
INVENTOR
James. C. Anderson
BY
ATTORNEY.

UNITED STATES PATENT OFFICE.

JAMES C. ANDERSON, OF HIGHLAND PARK, ILLINOIS.

WHEEL FOR AUTOMOBILES OR OTHER VEHICLES.

SPECIFICATION forming part of Letters Patent No. 637,691, dated November 21, 1899.

Application filed June 14, 1899. Serial No. 720,516. (No model.)

*To all whom it may concern:*

Be it known that I, JAMES C. ANDERSON, a citizen of the United States, residing at Highland Park, in the county of Lake and State of Illinois, have invented certain new and useful Improvements in Wheels for Automobiles or other Vehicles; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to certain new and useful improvements in wheels for vehicles and especially that class known as "automobiles."

In automobile vehicles, as is well known, the power exerted for the propulsion of the vehicle is applied in a rotary direction directly to the wheel in contradistinction to the application of power in a horizontal and longitudinal direction to the vehicle, as in common use. When the power is applied directly to the wheel, the tendency is to cause the same to slip upon the road without effecting the desired propulsion of the vehicle, and consequently it has been found not only desirable, but absolutely necessary, to equip the wheels with tires having such properties or characteristics as to secure the proper degree of adhesion to the roadway. In the progress of the art in the direction stated it has and will necessarily follow that the use of materials adapted to secure the required traction involves a more rapid destruction of the tread-surface of the tire, and with this knowledge in view the most approved material thus far used has been rubber, and for the sake of economy and in the lighter classes of automobiles inflatable or pneumatic tires have been used, although in the heavier class known as "autotrucks" solid tires are necessary; but in both cases the necessary wear which takes place cannot be readily and economically compensated for, and a further concomitant disadvantage in the pneumatic tire rests in the fact that they are to a greater or less degree liable to puncture, which liability is greatly increased owing to the fact that in the ordinary use of automobiles they must of necessity travel over roadways not especially adapted to the use of such tires, and hence it has been found that the use of pneumatic tires involves frequent delays in travel and very large expense in repair and renewal, it having been ascertained that the average longevity of tires costing about twenty-five dollars each is from three to six weeks.

My invention has for its object to provide a wheel for automobiles which shall embody all of the advantages of wheels provided with pneumatic tires or solid-rubber tires in so far as traction is concerned, which shall take up what is known as the "momentum shock," which will not creep upon the rim, which shall be noiseless, economic of original construction, and quickly and cheaply renewed or repaired when necessary.

With these ends in view my invention consists in providing the rim of the wheel with a steel or other suitable metallic circumferential box or tire-receptacle of peculiar form and arranging therein and projecting therefrom a tire proper or tread-surface composed of asphaltum and other ingredients applied in manner and proportions as hereinafter fully explained.

In order that those skilled in the art may know how to make my improved wheel and fully understand all of its advantages, I will proceed to describe the same in detail, referring to the accompanying drawing, which represents, partly in section and partly in perspective, a portion of the rim and tire of a wheel embodying my invention, and in which—

A is an ordinary wooden felly or rim, to which is secured by suitable screw-bolts B a steel box or receptacle C, having a dovetail recess, as shown. The dovetail recess constitutes a receptacle for the composition tire and serves to hold the same securely in place, as will be presently explained, and by reason of the shape of the circumferential receptacle a comparatively broad surface is obtained at the edge of each of the lateral walls or sides of the said box or receptacle.

D is the tire proper, located within the dovetail recess of the box C and extending beyond the latter, as clearly shown, to constitute the tread. This tire is composed of asphaltum and any comminuted material having the characteristic of resistance to abrasion—such, for instance, as metallic filings, corundum, sand, &c.—and it will be understood that wherever hereinafter I use the expression "sand or its equivalent" I mean to be understood that I may mix with the body or base of the composition any comminuted or granulated material best adapted to resist the abrading effect which follows from the ordinary contact between the tire and a roadway, the proportions and mixture being such as I will now proceed to describe.

In filling the receptacle or dovetail space I first employ pure asphaltum at the base or what may be termed the "bottom" of the receptacle. I then complete the filling of said box or receptacle and extend beyond the same asphaltum mixed with sand or any equivalent of sand in such proportions as to obtain a sufficient degree of solidity and hardness for the tire. This I do by gradually increasing the quantity or proportion of sand or equivalent until the proper degree of hardness is secured to protect the tire against undue wear and at the same time without depriving it of its grasping or traction quality or depriving it of its adaptability to take up the momentum shock.

To properly and expeditiously form and locate the tire within its recess in the box C, I employ an apparatus which constitutes the subject-matter of a concurrent application, Serial No. 720,514, filed by me on the 14th day of June, 1899; but it will be obvious that I may build up the tire by hand, and therefore I do not deem it necessary to herein describe in detail any particular apparatus or machine for making the tire.

While I have shown the securing-bolts B countersunk in the base or bottom of the box C, it will be obvious that in view of the character of the material constituting the tire said bolts need not be so countersunk.

When my improved wheels are in use, it will be readily understood that the weight of the vehicle and any load carried therein will tend to continuously compact the tire between the inclined sides of the dovetail recess in the receptacle or box C and that the sand or equivalent originally incorporated in the asphaltum or which may be picked up by the tread-surface of the tire will be gradually forced toward the base of the tire, thus tending to intensify or strengthen the union between the tire and its receptacle.

Ultimately and after long and satisfactory service it may become necessary to renew the tire, and this can be accomplished by removing the contents of the box or receptacle and replacing it with a new tire in the manner hereinbefore described. Any ordinary wear of the outer or tread surface of the tire may be compensated for and the tire restored to its original condition at any time by warming the outer surface of the tire and revolving it in a bath of asphalt and sand or equivalent in suitable proportions. As before stated, the peculiar or dovetail shape of the tire-receptacle secures comparative broad surfaces to what may be termed the "outer" edges of the side walls, and if for any reason it should be impracticable at any time to rebuild the tire and it should wear down to a plane coincident with the side walls of the box the comparative broad surfaces of the outer walls will coöperate with the confined composition tire and render it efficient until such time as it may be conveniently built up and restored to its proper height or thickness.

In considering the many advantages of my improved wheel over the ordinary pneumatic tire or solid-rubber tire I desire to draw attention to the fact that in vehicles such as my improved wheels are designed for it is not at all necessary that there should be any spring action in the wheel, as all such vehicles are provided with other suitable springs, and it is only necessary that the tires should have such inherent properties that the momentum shock may be taken up and dissipated and that the unpleasant noise produced by the contact of an ordinary metal tire with the roadway may be avoided. I desire to call attention to the further fact that all efforts heretofore made and in the use of any material heretofore suggested the elasticity of the tire has been secured necessarily at the expense of the wearing properties of material used and that repairs of such tires are necessarily expensive and require expert manipulation to a greater or less extent, while with my improved tire the material employed is such that it may be readily grafted upon for the purpose of compensating for any natural wear and that the process or method of ingrafting material upon the tire does not require or embody any expert manipulation.

Having described the construction and advantages of my invention, what I claim as new, and desire to secure by Letters Patent, is—

1. As a new article of manufacture a vehicle-wheel having the rim surrounded and equipped with a box or receptacle and a tire located within and extending from said box and composed of asphaltum and sand or its equivalent, substantially as hereinbefore set forth.

2. In a wheel, the combination with the rim A, a metallic box or receptacle C formed with a dovetail recess as described, and a tire D composed of asphaltum and sand or its equivalent, as and for the purpose set forth.

In testimony whereof I affix my signature in presence of two witnesses.

JAMES C. ANDERSON.

Witnesses:
N. CURTIS LAMMOND,
JNO. J. HARROWER.